United States Patent
Impellizeri

(10) Patent No.: US 7,546,693 B1
(45) Date of Patent: Jun. 16, 2009

(54) LOCKING FLEXIBLE TRANSMISSION DIPSTICK

(75) Inventor: John Impellizeri, Knoxville, TN (US)

(73) Assignee: Lokar, Inc., Knoxville, TN (US)

( * ) Notice: Subject to any disclaimer, the term of this patent is extended or adjusted under 35 U.S.C. 154(b) by 11 days.

(21) Appl. No.: 11/955,887

(22) Filed: Dec. 13, 2007

(51) Int. Cl.
*G01F 23/04* (2006.01)
(52) U.S. Cl. .......................................... 33/731; 33/722
(58) Field of Classification Search ................... 33/731, 33/722, 726, 728
See application file for complete search history.

(56) References Cited

U.S. PATENT DOCUMENTS

| | | | | |
|---|---|---|---|---|
| 3,474,884 A | * | 10/1969 | Braun .......................... | 184/109 |
| 3,722,102 A | * | 3/1973 | Jackson et al. ................ | 33/731 |
| 4,761,886 A | * | 8/1988 | Wilson et al. ................. | 33/722 |
| 5,014,445 A | * | 5/1991 | Martell ........................ | 33/731 |
| 5,022,495 A | * | 6/1991 | Lavender ................. | 184/105.1 |
| 5,086,943 A | * | 2/1992 | Poskie ......................... | 220/374 |
| 5,113,594 A | * | 5/1992 | Ishihara et al. ................ | 33/722 |
| 5,485,681 A | * | 1/1996 | Hitchcock .................... | 33/722 |
| 5,992,037 A | * | 11/1999 | Klotz .......................... | 33/722 |
| 6,453,740 B1 | * | 9/2002 | Williams et al. .......... | 73/290 B |
| 6,935,044 B2 | * | 8/2005 | Dougherty et al. ............ | 33/728 |

* cited by examiner

*Primary Examiner*—Christopher W Fulton
(74) *Attorney, Agent, or Firm*—Pitts & Brittian, P.C.

(57) ABSTRACT

A flexible locking dipstick module useful with a motor vehicle transmission including a transmission case. A transmission dipstick is disposed within a housing which has one end thereof affixed to the transmission case and extends therefrom to a location within the engine compartment of a motor vehicle. Each end of the module includes a quick disconnect locking coupling providing for ready installation of the dipstick housing and its associated dipstick. Each coupling further provides protection against blow out of the dipstick in the event of inordinate build up of pressure within the transmission. Further, one portion of the outboard coupling may be employed as a liquid-tight closure for a dipstick entry opening in the transmission case during removal and/or storage of the transmission case.

5 Claims, 6 Drawing Sheets

LOCKING FLEXIBLE TRANSMISSION DIPSTICK

CROSS-REFERENCE TO RELATED APPLICATIONS

Not Applicable

STATEMENT REGARDING FEDERALLY SPONSORED RESEARCH OR DEVELOPMENT

Not Applicable

FIELD OF INVENTION

This invention relates to motor vehicle parts and accessories and particularly to dipsticks useful in the transmission case for a motor vehicle.

BACKGROUND OF INVENTION

In motor vehicles, dipsticks are employed for purposes of visual inspection of the quantity (and to a lesser degree of the quality) of transmission fluid located within a closed transmission case of a motor vehicle. In general, transmission cases of motor vehicles commonly are provided with an opening leading from external of the transmission case into the interior of the case. Often this opening is provided with a fitting, such as a hollow tube. A first end of the tube is mounted in the opening leading into the transmission case. The tube extends from the fitting to a termination location within the engine compartment of the vehicle, but remote from the transmission case. Thus, the open terminal end of the tube is readily accessible within the engine compartment of a motor vehicle. An elongated removable dipstick may be inserted into the terminal end of the tube and into the interior of the transmission case. Within the transmission case, the end of the dipstick becomes immersed within the fluid disposed within the case. The extent of insertion of the dipstick into the case is limited to a constant value established commonly by some form of stop on the dipstick which engages the terminal end of the tube to limit that distance by which the dipstick may be inserted into the case. Such extent of insertion distance is thus maintained constant over each and every time the dipstick is inserted into the case. By this means, upon withdrawal of the dipstick from the case, the level of fluid on that end of the dipstick which is inserted into the case is indicative of the level (quantity) of fluid within the case. Other than during the action of checking the level of fluid with the case, the dipstick is stored within its tubular housing.

As noted, commonly, such dipsticks are removably mounted within an elongated tubular housing which is itself anchored at one end thereof within the opening through the transmission case. Such tubular housing commonly extends from the transmission case upwardly to terminate at a location, commonly within the engine compartment of the vehicle, wherein the dipstick is readily grasped for insertion into and withdrawal from its tubular housing and the transmission case. For example, the outboard terminal end of the dipstick housing commonly may be anchored to a suitable location on the engine or on the fire wall or other element of the motor vehicle within the engine compartment of the vehicle to ensure rigidity of the tubular housing and its enclosed dipstick during operation of the motor vehicle. Dipsticks commonly are secured within their tubular housing employing some form of structure suitable for grasping with one's hand for removal and reinsertion of the dipstick relative to its housing. This structure may include an element which is frictionally slidably received within the outboard end of the tubular housing and serves in part to seal off the open outboard end of the housing. These devices are prone to leakage of transmission fluid from the tubular housing and fail to ensure the retention of the dipstick within the housing under certain vehicle operating conditions.

In certain motor vehicles, such as racing cars, the operation of the vehicle builds up substantially inordinate pressure within the transmission case. Such pressure levels may be sufficient to "blow out" a prior art dipstick from its elongated tubular housing with obvious disastrous results which may include starting a fire within the engine compartment of the vehicle. Also, there exist the problems associated with oil leaking onto a race track, resulting in slick tires, crashes and monetary penalties.

Further, in racing cars in particular, transmissions are not uncommonly subjected to forces sufficient to cause partial or complete operational failure of the transmission. Upon such failure of the transmission, it is common for the mechanic team for the racing car, in the course of a given race, to change out the entire nonfunctional transmission and replace it with an operational transmission. Obviously such transfer of transmissions must be completed within a minimum of time. In the prior art, precious seconds may be consumed in connection with the removal of a transmission dipstick and its housing from a "blown" transmission and replacement of the same with a new housing (and dipstick) while at the same time trying to minimize the time consumed in replacing the overall transmission.

DETAILED DESCRIPTION OF THE INVENTION

Figure 1:
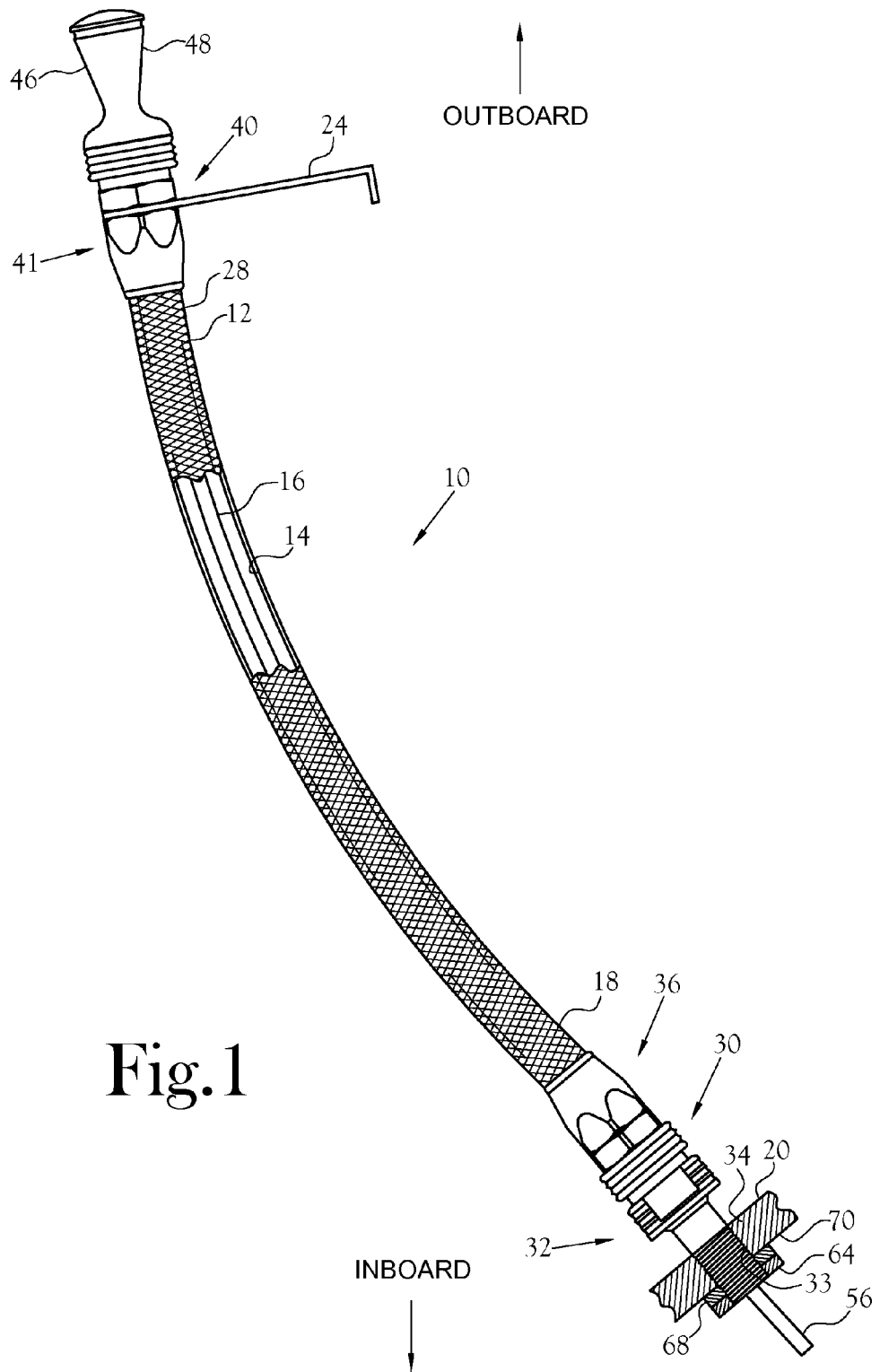
FIG. 1 is a representation, part in section, of a dipstick module embodying various aspects of the present invention.

In one embodiment of the present invention depicted in the several figures, there is provided a transmission dipstick module 10 which includes an elongated, hollow, flexible dipstick housing 12. In a preferred embodiment this housing comprises braided metallic strands disposed about a fluid impervious flexible inner lining 14, thereby rendering the housing flexible and resistant to rupture. A typical housing exhibits an internal diameter of between about ⅜" and about ¾" inch and is capable of withstanding fluid pressures in excess of several hundred lb/in$^2$.

Again, preferably, the housing is provided with an internal lining suitable for accommodating the flexibility of the housing and enhancing the insertion and withdrawal of a flexible dipstick 16 along the length of the housing. One suitable lining material is a polymeric material such as Teflon which is resistant to the transmission fluid. Other liner materials may be employed.

In accordance with one aspect of the present invention, the inboard first end 18 of the dipstick housing is removably anchored to the transmission case 20 and the outboard second end 28 is secured, as by a bracket 24, at a location within the engine compartment, for example, where the outboard second end 28 of the housing is readily accessible for the insertion and withdrawal of the dipstick in and out of the housing.

Figure 2:
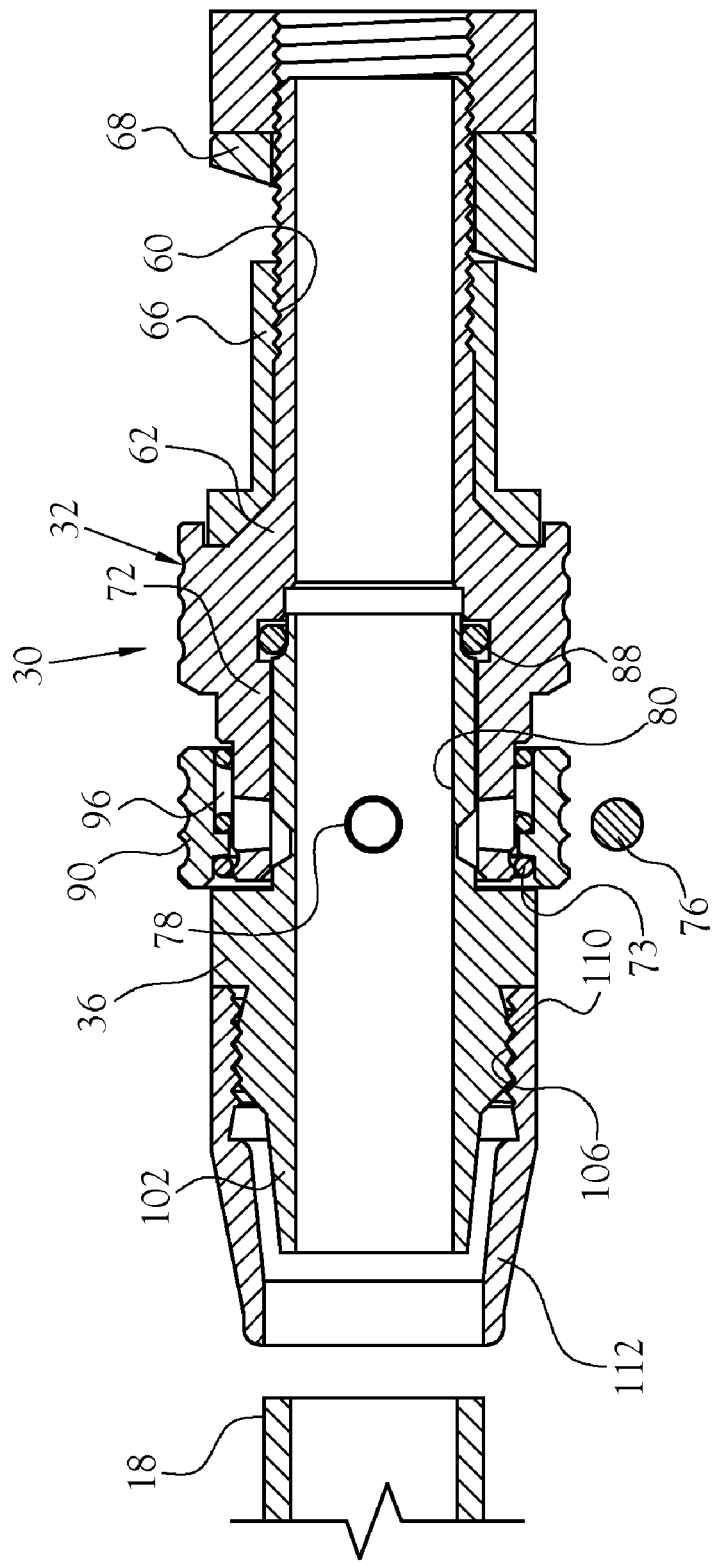
FIG. 2 is a representation, part in section, of one embodiment of an inboard quick release coupling of the present invention disposed intermediate a dipstick housing and an opening leading into the transmission case.
Figure 3:
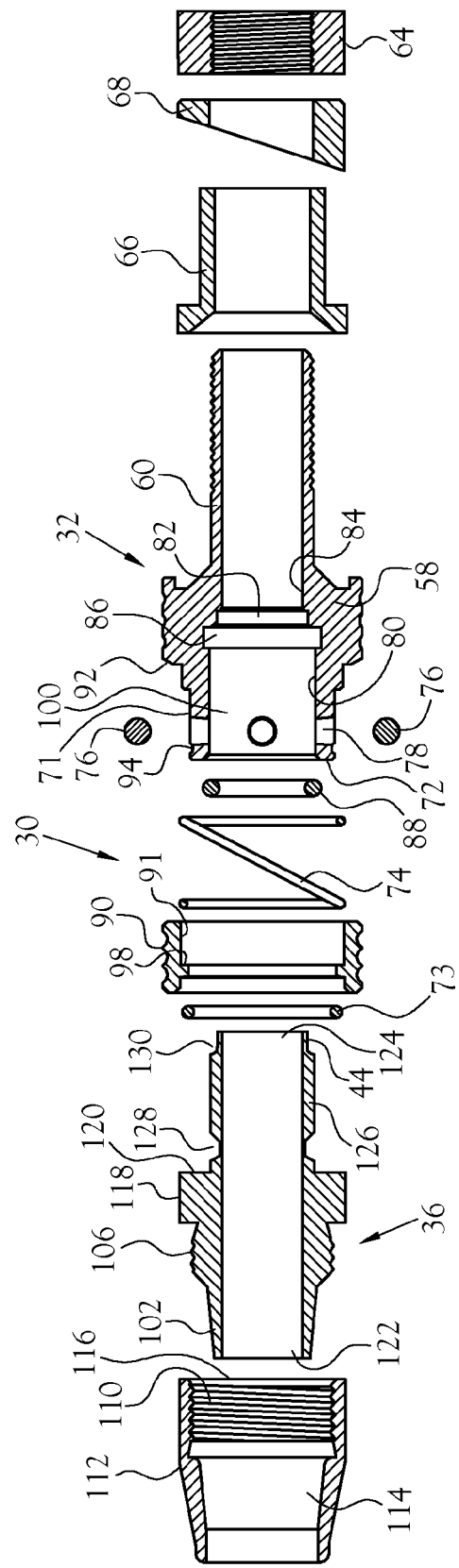
FIG. 3 is an exploded side elevation representation, part in section, of the inboard quick release coupling depicted in FIG. 2.

To this end, as depicted in FIGS. 1-3, the interconnection of the inboard end 18 of the housing to the transmission case is in the form of an inboard quick disconnect coupling 30 which includes a generally tubular first element 32 adapted to be fixed to the transmission case in the opening 33 through the wall 34 of the transmission case 20 and a second generally tubular element 36 which is fixed to the inboard end 18 of the housing. These two elements are adapted to be quickly and securely interconnected liquid-tight. For example, the interconnection of the first and second elements will remain liquid-tight if exposed to relatively high fluid pressure exceeding several hundred lbs/in$^2$. As noted, this coupling is quickly and readily connected and/or disconnected.

As depicted in FIGS. 1 and 4-6, the outboard terminal end 28 of the dipstick housing is provided with an outboard quick disconnect coupling 40. This outboard coupling includes mating first and second elements 41 and 43, respectively. The first element 41 of this outboard coupling 40 comprises an generally tubular body portion 42 having an inboard end 44 which is adapted to be affixed to the outboard end 28 of the dipstick housing 12.

The second element 43 of the outboard coupling 40 comprises a knob 46 having a first end 48 which preferably is contoured in a manner to facilitate grasping of the knob in a user's hand. The opposite and second end 50 of the knob includes an elongated projection 52 extending linearly from the second end of the knob and is adapted to be interconnected with the outboard end 22 of the dipstick 16, as by means of a set screw 38, for example. This projection is further adapted to be sealingly and releasably received within the open end 54 of the first element 41 of the outboard coupling 40 opposite the dipstick housing.

The projection 52 which extends from the knob is in the form of a plug adapted to be received in liquid-tight sealing, but removable, relationship within the first element 41 of the outboard coupling 40 when the dipstick is inserted within its housing. Thus, the outboard coupling 40 functions first to seal liquid-tight the outboard coupling 40 to the outboard end 28 of the housing and to establish the extent to which the dipstick may enter the dipstick housing, hence the depth to which the inboard end 56 of the dipstick may become immersed in transmission fluid contained within the transmission case, and as an aid to preclude expulsion of the knob (i.e., the plug), hence the dipstick, in the event of a buildup of potentially damaging fluid pressure within the transmission case.

Figure 6:
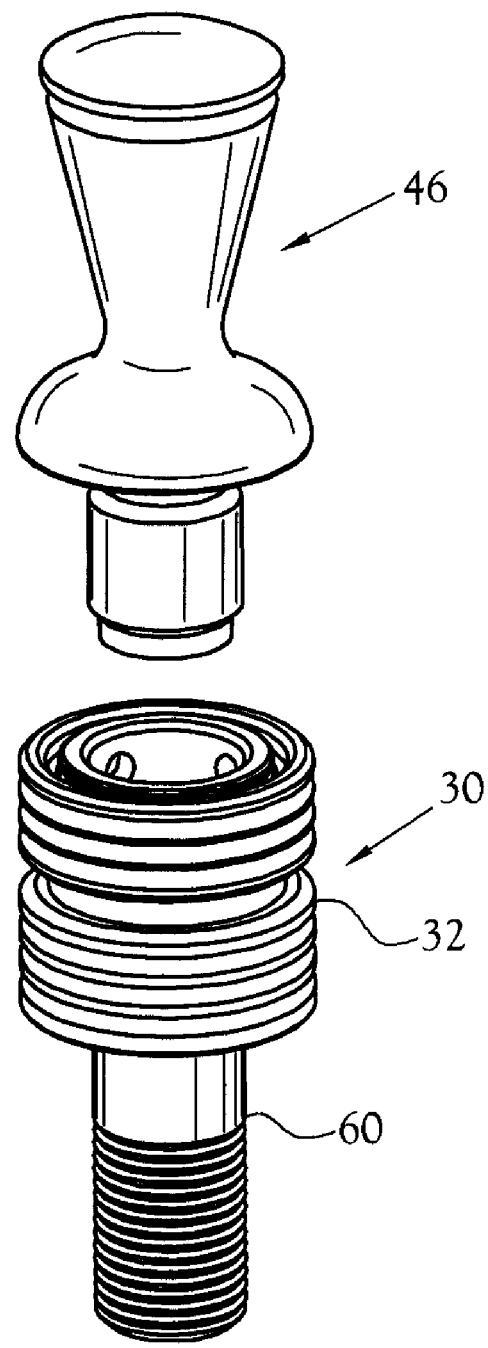

As depicted in FIGS. 1, 3 and 6, in one embodiment, the inboard quick disconnect coupling 30 associated with the transmission case and disposed intermediate the case and the inboard end 18 of the dipstick housing, comprises a first element 32 adapted to be mounted within the opening 33 in the transmission case and a second element 36 which is adapted to be quickly releasable from the first element.

In one embodiment, the first element 32 of the inboard quick disconnect coupling 30 includes a generally tubular body portion 58 having an externally threaded generally tubular extension 60 projecting therefrom and adapted to be threaded into the opening 33 in the transmission case 20. It will be recognized that means, other than threads, may be employed for suitably interconnecting the tubular extension 60 with the opening in the transmission case. A lock nut 64 may be employed to secure this first element in the transmission case opening. Further, in one embodiment, the inboard portion of the extension may be provided with an encircling sleeve 66 of a material suitable for forming a liquid-tight seal between the body portion 58 of the first element 32 and the transmission case. In one embodiment, this sleeve may be of a polymeric material which is resistant to damage by transmission fluid and which is sufficiently resilient to define the desired seal against leakage of transmission fluid out of the transmission case. It will be recognized by one skilled in the art that other sealing means and/or seals of non-polymeric materials may be employed. As needed for differently designed transmissions, there may be provided a washer-type spacer 68 suitable to encircle the projection of the body portion into the transmission case and to be interposed between the lock nut 64 and the inner wall 70 of the transmission case.

The opposite (inboard) end 72 of the body portion 58 of the first element 32 of the inboard coupling 36 also is generally tubular, and houses internally thereof, an "O" ring, a coil spring 74, a snap ring 73 and a plurality of ball bearings 76 which are partially embedded within appropriate throughholes 78 in the inner wall 80 of the body portion of the first element 32 of the inboard coupling at circumferentially spaced apart locations. In the depicted embodiment, the throughholes are contoured to permit each ball bearing to project outwardly from the outer circumference of the outboard end 72 of the first element proximate its outboard end 72.

As depicted in FIGS. 2 and 3, the body portion 58 of the first element 32 of the inboard coupling 30 is provided with a circumferential open groove 82 in the inner wall 84 of the body portion at a location approximately half-way between the opposite ends of the body portion. This groove is sized to accept therein the outboard end 44 of the second element 36 of the inboard coupling 30 as will appear hereinafter. Immediately adjacent the open groove 82 and on the inboard side of the open groove 82, there is provided a further circumferential groove 86 which is of a larger outer diameter than the open groove 82 and defines an annular receptacle for the ring seal 88 when the first and second elements 32 and 36, respectively are coupled.

Externally of the inboard end 72 of the body portion 58 of the first element 32 of the inboard coupling 30 there is provided a circumferential collar 90 which is slideable along such inboard end 72 between an outer circumferential shoulder 92 defined on the outer circumference of the body portion 58 approximately half-way between the opposite ends of the body portion and a split ring retainer 73 disposed within a further circumferential groove 94 proximate the inboard end 72 of the outer wall 71 of the body portion 58. This collar is of an inner diameter greater than the outer diameter of the inboard end of the body portion 58 so that there is defined between the collar and the outer surface 71 of the inboard end of the body portion an open annular space 96.

Further, the collar 90 is provided with a circumferential flange 98 on the inboard end of the inner wall 91 of the collar. This flange serves, among other things, to establish concentricity between the collar and the underlying outer wall 71 of the inboard end 72 of the body portion 58.

Within the annular space 96 between the collar and the inboard end of the body portion of the first element, there is provided a coil spring 74 which encircles the outer circumference of the inboard end of the body portion of the first element. This spring is captured in the open space 96 between the collar and the outer wall of the body portion of the first element, and between the circumferential flange on the outer wall of the body portion of the first element and the circumferential flange on the inboard end of the inner wall of the collar. The spring thus functions to bias the collar toward a position proximate the inboard end of the first element 32.

As depicted, the split ring retainer 73 disposed in the further groove 94 within the outer wall 71 of the inboard end of the body portion 58 is adapted to halt the outward movement of the collar and prevent the collar from sliding off the inboard end of the body portion of the first element of the inboard coupling.

Within the inner wall 80 of the body portion 58 of the first element 32 of the inboard coupling 30 there is provided a plurality of ball bearings 76 which are partially embedded within respective throughholes 78 in the inner wall of the body portion of the outboard coupling proximate, but interiorly of, the retention ring 73. The depth of embedment of each ball bearing provides for a relatively small portion of the outer surface of each ball bearing to project radially inwardly from the inner wall 84 of the inboard end of the body portion 58 of the inboard coupling into the hollow central space 100 of the inboard end of the body portion, thereby being in position to engage the second element 36 of the inboard coupling within the first element 32. To this end, the circumferential flange 98 may be brought into circumferential register with the ball bearings thereby locking the ball bearings into their detents by the established maximum extent, hence releasably locking the first and second elements 32 and 36 in sealed liquid-tight relationship to one another.

The tubular dipstick housing 12 of the depicted embodiment of the present invention includes a first end, designated herein as the inboard end 18, (i.e. nearest the transmission) which slidably passes through he inboard coupling 30 and into the transmission case.

For interconnection of the dipstick housing and the second element of the inboard coupling 30, the second element 36 of the inboard quick disconnect coupling includes a first tubular end 102 which is sized and internally outwardly tapered to receive thereon the inboard end 18 of the dipstick housing. The outer circumference of this first end of the second element is provided with external threads 106 adapted to matingly receive the internal threads 110 of a truncated conical shroud 112 having an inwardly tapered throughbore 114 extending along at least a portion of the length of the shroud thereby providing an open inlet end 116. When the inboard end 18 of the dipstick housing 12 is fitted onto the tapered end of the inboard second element 36, the shroud is threaded onto such end of the second element, thereby capturing the inboard end 18 of the dipstick housing therebetween and anchoring the second element 36 to the dipstick housing.

As noted, the central hollow interiors of the first and second elements 32 and 36 of the inboard coupling 30 are in alignment with one another to permit the passage therethrough of the dipstick (or for the introduction of transmission fluid into the transmission case, if desired).

The second element 36 of the inboard coupling 30 is designed to be received in and releasably locked to the first element 32 of this inboard coupling. To this end, intermediate the opposite first 122 and second 124 ends of the second element 36 there is provided an external circumferential shoulder 118 defining a stop 120. On the second end 124 of the second element 36, there is provided a cylindrical projection 126 between the stop 120 and the inboard end of this second element 36. On the outer diameter of this cylindrical portion of the second element there are defined first and second circumferential grooves 128 and 130, respectively, the first of which is located proximate the stop 120 and the second of which is located proximate the inboard end 124 of this cylindrical projection 126.

To permit insertion of the projection 126 on the inboard end 124 of the second element of the inboard coupling 30 into the open outboard end 72 of the first element 32 of the inboard coupling 30, the circumferential groove 130 is cut sufficiently deep and wide as to reduce the outer diameter of this inboard end 124 to enter into the groove 82 defined internally of the first element 32 of this inboard coupling 30, and further to permit the receipt therein of the ring seal 88. When these first and second elements of the outboard coupling are fully engaged (including locking of the ball bearings in their respective throughbores), the foregoing described structure defines a liquid-tight seal at a location approximately halfway between the opposite ends of the inboard coupling 30. Various of the outboard elements of the quick disconnect coupling are designated by primed numerals to indicate their like construction as the elements of the inboard coupling 30.

The second circumferential groove 128 defined on the outboard end 44 of the second element 36 of the inboard coupling 30 is so positioned as to be in register with the ring of ball bearings 76 disposed within the outboard end 72 of the first element 32 of the inboard coupling when the first and second elements of this coupling are fully engaged. It is to be noted that full insertion of the end 44 of the second element 36 into the open end 72 of the first element 32 of the inboard coupling 30 can only be accomplished when the collar 90 encircling the first element 32 of the coupling is urged longitudinally inwardly of the first element 32 against the force of the coil spring 74, thereby moving the internal shoulder 98 of the collar away from the ball bearings 76 in the wall of the first element 32. Upon such retraction of the collar, full insertion of the end 44 of the second element 36 into the open end 72 of the first element 32 serves to position the circumferential groove 128 of the second element 36 into alignment with the ring of ball bearings disposed in the inboard end of the first element. Thereupon, the collar may be released resulting in movement of the shoulder thereof into register with the ball bearings, thereby locking the first and second elements of the inboard coupling together. Decoupling of the first and second elements of the inboard coupling is effected by again urging the collar inwardly of the first element, thereby releasing the ball bearings to the extent necessary for separation of the first and second elements.

Figure 4:
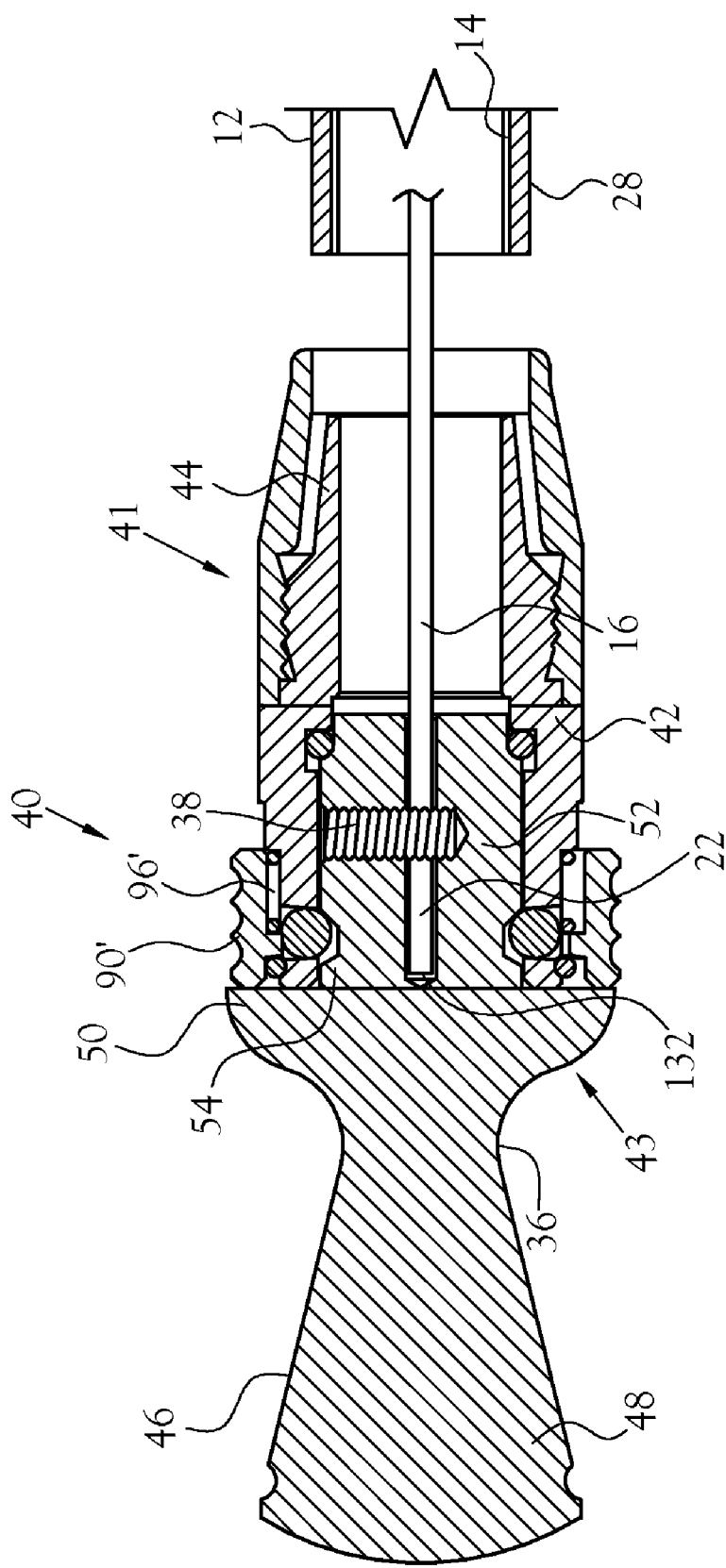
FIG. 4 is a representation, part in section, of one embodiment of an outboard quick release coupling of the present invention as mountable on the outboard end of a dipstick housing.
Figure 5:
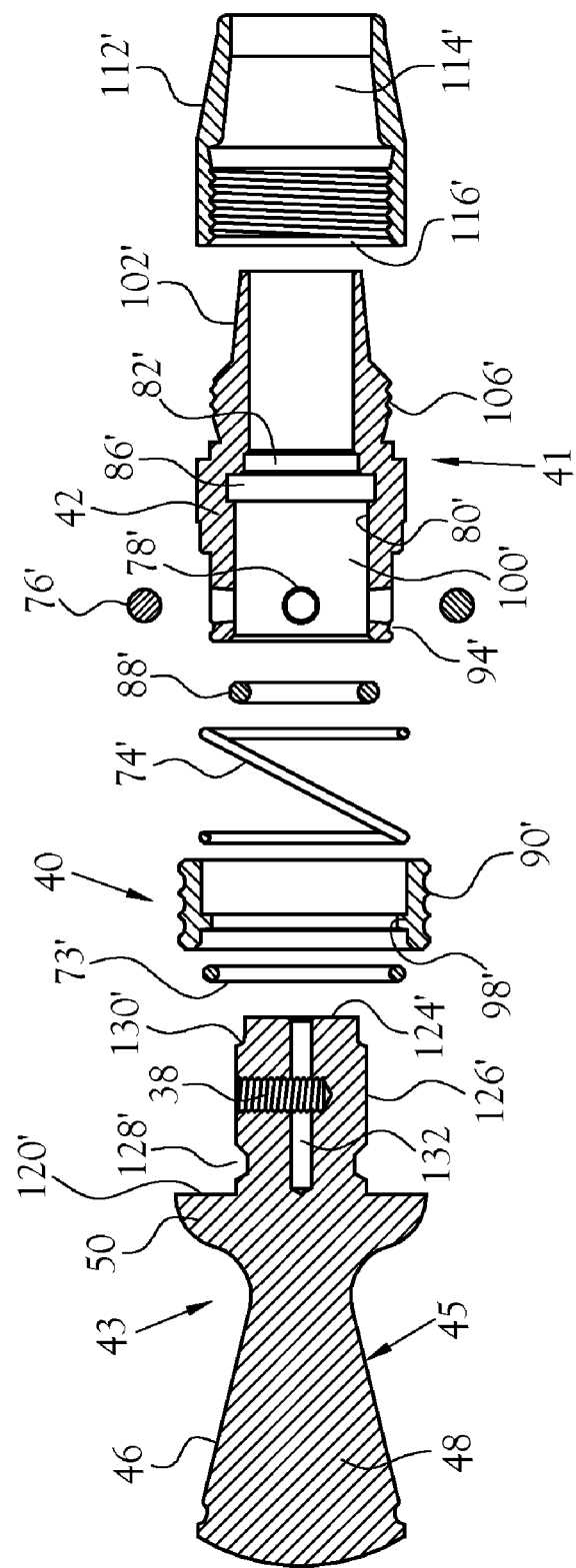
FIG. 5 is an exploded side elevation representation, part in section, of the outboard coupling depicted in FIG. 4; and, FIG. 6 is a representation of the insertion of a plug into the inboard coupling of the present invention.

As depicted in FIGS. 4 and 5, it will be recognized that the outboard end 28 of the dipstick housing 12 is attached to the outboard coupling 40 in substantially like manner as the connection of the inboard end 18 of the dipstick housing to the inboard coupling 30. Further, the mechanism for coupling and decoupling of the first and second elements 41 and 43, respectively, of the outboard coupling 40 are of construction and function which are substantially similar to the construction and functioning of the aforedescribed inboard coupling 30.

Notably, the second element 43 of the outboard coupling 40 of the present invention comprises a knob 46 whose geometry defines a type of plug 45 which is contoured for ready grasping by a user's hand for effecting insertion and withdrawal of the second element from the mating first element 41. As with the inboard coupling, coupling and uncoupling of the first and second elements 41, 43 of the outboard coupling requires linear movement of a collar 90' disposed on the first element 41 of the outboard coupling 40. More specifically, the first element 41 of the outboard coupling defines an open central space 100' into which a projection 52 on the second element 43 is removeably received. As with the inboard coupling, locking and unlocking of the first and second elements 41, 43 of the outboard coupling includes sliding the collar 90' against the retaining force of a coil spring 74' away from its locking position relative to the ball bearings 76' and either insertion or withdrawal of the projection 52' into coupled or uncoupled engagement with the first element 41. In the outboard coupling, the multiple grooves 82', 86', 94', 130' and 128', as well as the seal ring 88' and the split ring retainer 73' are identical to and function like their counterparts in the inboard coupling.

As depicted in FIG. 4, attachment of the outboard end 28 of the dipstick housing 12 to the first element 42 of the outboard coupling 40 is accomplished by means of a shroud 112' having an open end 116' and a throughbore 114', these elements also being structured and functioning as their counterparts as described in discussing the inboard coupling 30 hereinabove.

As depicted in FIGS. 4 and 5, the inboard end of the second element 43 of the outboard coupling 40 is provided with a blind bore 132 adapted to receive therein the outboard end 22 of the dipstick 16. That portion of the dipstick which resides within such blind bore is anchored therein as by a set screw 38, or other suitable connector, disposed within an internally threaded bore which extends from the external wall of the plug into the blind bore. Thus, withdrawal or insertion of the dipstick from its housing, hence from the interior of the transmission case, may be accomplished via the plug. Importantly, this plug is releasably locked against expulsion of such plug from the first element 41 upon substantial buildup of pressure within the transmission case and within the dipstick housing which is in fluid flow communication with the interior of the transmission case, by like elements as described in connection with the inboard coupling 30, e.g. locked ball bearings, etc.

As seen in FIG. 1 there may be provided a bracket 24 adapted to mount the outboard coupling to a location within the engine compartment. When the present invention is so mounted, the inboard coupling may be readily and quickly decoupled, thereby providing for quick disconnection of the dipstick housing from the transmission case to permit removal and replacement of the transmission without consuming valuable time in the dismounting and remounting of the dipstick housing within the engine compartment.

As depicted in FIG. 6, in those instances where it is desired to place a transmission fitted with the present invention into storage, either short term or extended storage, upon decoupling of the inboard coupling, the knob 46 of the outboard coupling 40 (with the dipstick and its housing removed) may be coupled with the first element 32 of the inboard coupling 30 to seal the throughbore in the transmission case against loss of fluid from, or undesirable entry of debris or other foreign matter into, the case of the stored transmission.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed:

1. A flexible locking dipstick module useful with a motor vehicle transmission including a transmission case comprising:

an elongated dipstick having an inboard end and an outboard end, said inboard end being proximate the transmission case, an elongated dipstick housing having an inboard end and an outboard end relative to the transmission case; said housing being adapted to receive therein said dipstick for limited insertion of said dipstick into the transmission case a throughbore providing for fluid and mechanical communication between the exterior and interior of the transmission case, a first coupling element interposed between said inboard end of said dipstick housing and the transmission case and adapted to provide locking liquid-sealing, quick disconnect and reconnection of said inboard end of said housing with respect to said throughbore while further providing for fluid and mechanical communication between the interior of the transmission case and said elongated dipstick housing, a second coupling associated with said outboard end of said dipstick housing, said second coupling including a first element affixed to said outboard end of said dipstick housing and a second element affixed to said outboard end of said dipstick, said first and second elements being matingly engageable relative to one another, and providing for liquid-sealing locking quick disconnection and reconnection of said first and second elements wherein said dipstick housing is flexible along its length and comprises a braided tube.

2. The module of claim 1 wherein said dipstick housing includes a flexible inner lining along the length thereof; said liner being of a material which is resistant to damage or deterioration by transmission fluid and which enhances the insertion and withdrawal of said dipstick into and out of said housing.

3. A tubular flexible dipstick housing, having first and second opposite ends, useful for determining the liquid level of transmission fluid within a transmission case of a motor vehicle transmission comprising a throughbore extending between the interior and exterior of the transmission case, a first coupling including first and second separable elements adapted to anchor said first end of said dipstick housing within said throughbore, a second coupling anchored to said second end of said dipstick housing, said second coupling including a first element of a quick-release element associated therewith, a dipstick adapted to be removably inserted within said dipstick housing and having a first end adapted to be insertable through said throughbore into the interior of the transmission case, said dipstick including a second end opposite to, and exteriorly of, the transmission case, said second end of said dipstick being anchored to said first element of said second coupling, said first and second elements of respective ones of said first and second couplings being adapted to quick releasably lockingly and liquid-sealingly engage one another wherein said dipstick housing comprises a metallic braided elongated tube.

4. A tubular flexible dipstick housing, having first and second opposite ends, useful for determining the liquid level of transmission fluid within a transmission case of a motor vehicle transmission comprising a throughbore extending between the interior and exterior of the transmission case, a first coupling including first and second separable elements adapted to anchor said first end of said dipstick housing within said throughbore, a second coupling anchored to said second end of said dipstick housing, said second coupling including a first element of a quick-release element associated therewith, a dipstick adapted to be removably inserted within said dipstick housing and having a first end adapted to be insertable through said throughbore into the interior of the transmission case, said dipstick including a second end opposite to, and exteriorly of, the transmission case, said second end of said dipstick being anchored to said first element of said second coupling, said first and second elements of respective ones of said first and second couplings being adapted to quick releasably lockingly and liquid-sealingly engage one another wherein one of a first one of first and second elements of each said first and second couplings comprises a collar element slidably mounted thereon whereby manual slidable movement of said collar element effects liquid-sealing locking or unlocking of said first and second portions of said first and second elements to one another.

5. The flexible housing of claim 4 wherein said collar element is biased toward a locking position.

\* \* \* \* \*

UNITED STATES PATENT AND TRADEMARK OFFICE
CERTIFICATE OF CORRECTION

PATENT NO. : 7,546,693 B1  Page 1 of 1
APPLICATION NO. : 11/955887
DATED : June 16, 2009
INVENTOR(S) : Impellizeri et al.

It is certified that error appears in the above-identified patent and that said Letters Patent is hereby corrected as shown below:

On the title page item (75), add -- Van N. Walls --

Signed and Sealed this

Twenty-fifth Day of August, 2009

David J. Kappos
*Director of the United States Patent and Trademark Office*